United States Patent Office 3,024,522
Patented Mar. 13, 1962

3,024,522
RHENIUM BONDED COMPOSITE MATERIAL AND METHOD
Joseph J. Cacciotti, Cincinnati, Ohio, assignor to General Electric Company, a corporation of New York
No Drawing. Filed July 24, 1959, Ser. No. 829,200
8 Claims. (Cl. 29—195)

This invention relates to high temperature, high strength composite materials and, more particularly, to a composite material bonded with rhenium and method for making same.

Increases in the operating temperatures of power producing apparatus has led materials specialists to search for a new type of structure or material. Their intent is to replace the so called "super" alloys based on such elements as columbium, tantalum, tungsten and molybdenum which in their present state of development are not practical for use at temperatures in the 1600–2600° C. range.

A group of materials of great interest is one based on elemental carbon, for example, including carbon, graphite, plastics and their combinations. Of these materials, graphite, for one example, resembles a ceramic in many respects such as in its porosity and its brittleness in the lower temperature range. However, it has many metallic characteristics such as thermal conductivity and shock resistance as well as ease of machinability. Important is the fact that graphite is one of the strongest structural materials for operation at such high temperatures.

However, the surface of graphite has poor resistance to ablation; losses attributable to both erosion and chemical reactivity in rapidly moving gas or vapor streams. Its low temperature strength necessary for assembly and other types of handing is poor compared with that of more metallic materials.

In work with and study of graphite articles for relatively short time operating power producing apparatus employing rapid flow of gases in extremely hot, chemical reactive atmospheres, it has been noted that a coating of tungsten will provide graphite with the necessary resistance to ablation. However, tungsten alone would not form a suitably strong and stable bond with graphite.

A principle object of this invention is to provide a composite structure including a rhenium bond between a group of carbon materials and refractory materials, such bond increasing the stability between elemental carbon and the covering refractory layer.

Another object is the provision of a method for producing such composite structure.

These and other objects will become apparent from the description and the examples which are representative of this invention but not meant to be limitations thereon. It is intended to define the scope of this invention in the appended claims.

Briefly stated, in accordance with one form of this invention, a graphite substrate is provided in a first layer of rhenium and a second layer of a material selected from such refractory elements such as tungsten, columbium, tantalum and their alloys. The method, in one form, comprises the steps of electrodepositing rhenium on a clean graphite surface, heat treating the plated material and then metal spraying a refractory metal over the rhenium layer.

Rhenium electrodeposited coatings on carbon and particularly on graphite have been reported as a barrier to the corrosive action of liquid metals. Generally the rhenium coated graphite was used in closed piping systems not subjected to ablation.

In such cases, as in that of this invention, the best method for applying rhenium is by electrodeposition from an aqueous potassium perrhenate ($KReO_4$) solution adjusted in pH with sulphuric acid. The deposition is generally followed by a high temperature heat treatment to densify the rhenium coating and to improve the bonding between the rhenium and the graphite.

A study of the phase relationship between rhenium and tungsten and between rhenium and graphite indicates the formation of an undesirable Re-W eutectic alloy at about 2820° C., and an undesirable eutectic alloy between Re and graphite at about 2480° C. Thus the creation of a graphite-Re-W composite would seem to be sacrificing the high melting properties each of graphite, rhenium and tungsten by using rhenium to bond graphite to tungsten.

Nevertheless, despite what might be expected to happen, under highly ablating conditions, graphite bonded to tungsten through rhenium surpassed other combinations in its performance. It is believed that this success is based partially on the formation of a more ductile W-Re alloy at the interface of those two metals, and partially on the inhibition by rhenium of the formation of tungsten carbide.

Although rhenium can be deposited on the graphite by any suitable means, it is preferred to electrodeposit rhenium from the $KReO_4$ salt.

According to one form of the method of this invention, the first rhenium layer or coating is electrodeposited over a clean graphite surface from an aqueous solution of $KReO_4$ at a concentration of about 7–15 grams per liter and adjusted to a pH of 0.5–1.4 with sulphuric acid. The solution heated to a temperature of about 25–85° C. will deposit a satisfactory rhenium coating at a current density of about 0.1–0.7 amperes per square centimeter at an anode distance of about ¼–2½ inches from the surface to be coated. Time of plating, as in many electroplating situations, is a function of the surface to be covered and the thickness desired.

Although heat treatment is preferable immediately after plating and washing, it has been found that heat treatment as late as 4 hours after plating has no ill effect on the coating. However, coatings which have been heat treated as late as 15 hours after plating have been found to be porous.

The rhenium coated graphite then is vacuum heat treated within the temperature range of 1650–2000° C. to densify the rhenium and to cure the bonding between the rhenium and the graphite. The rhenium is then covered with a deposit of a refractory strengthening material such as tungsten, columbium and tantalum or their alloys which can be deposited by metal spraying techniques such as arc, flame, plasma, etc. The thickness of such material which can also be a refractory oxide, depends on the intended use of the article.

*Example 1*

The deposition of a first coating of rhenium and a second coating of tungsten was made on the inner surface of a molded graphite nozzle having a one inch diameter throat.

All dirt, grease and loose particles were removed from the surface to be coated such as by washing, baking at low and high temperatures and blowing with high pressure air. Rhenium was then electrodeposited to an average thickness of about 1 mil from a 30° C. aqueous solution consisting essentially of about 10 grams per liter of $KReO_4$ and sulphuric acid to adjust the pH to about 0.9.

A current density of about 0.3 ampere per square centimeter was used at about 4 volts. A conforming anode in the form of a platinum wire cage was used at a distance of about ½ inch from the surface being coated. A coating of about 3.1 grams was deposited over a surface area of about 60 square centimeters in about 7.6 hours.

After a rhenium coating was deposited, excess electroplating solution was removed from the surface such as by rinsing in clear water.

After drying, the rhenium coated nozzle was then heat treated at about 2000° C. in a vacuum of less than 1×10⁻³ mm. of mercury for 1 hour to densify the rhenium and to improve the bonding between the graphite and the rhenium.

After cooling the heat treated nozzle, a 50 mil thick layer of tungsten was sprayed over the rhenium from a standard wire type arc spray gun.

*Examples 2 and 3*

Composites of graphite-Re-Cb, and graphite-Re-Ta can be prepared by following the procedure of Example 1 except that Cb and Ta respectively are deposited by arc spraying over the rhenium coated graphite.

*Example 4*

The composite graphite-Re-refractory material can be prepared by first depositing a refractory metal such as tungsten on a mandrel. The sprayed tungsten body can then be removed from the mandrel and a layer of rhenium metal can be electrodeposited according to the method of Example 1. A graphite shape can then be molded around the rhenium-tungsten composite with the rhenium acting as an intermediate portion between the tungsten and the carbon surface. A high temperature vacuum heat treatment as described in Example 1 can then be conducted to densify the rhenium layer and to improve the bonding between the rhenium and the graphite.

In one of a number of comparisons of the W-Re-graphite composite with a W-graphite composite, rhenium plated graphite as well as unplated graphite specimens were coated with 15–20 mils of flame sprayed tungsten. The specimens were then heat treated at 2000° C. for one hour in a vacuum of less than 1×10⁻³ mm. of mercury.

Photomicrographs showed that the presence of 1 mil of rhenium reduced the formation of tungsten carbide by a factor of two compared with the graphite unplated with rhenium.

Although this invention was described in connection with specific examples, such examples are meant to be illustrative of rather than limitations on this invention. Those skilled in the art of metallurgy will recognize the modifications and variations of which this invention is capable.

What I claim is:

1. A method for making a rhenium bonded composite material comprising the steps of depositing a thin transition coating of rhenium metal on a refractory material selected from the group consisting of tungsten, columbium, tantalum and their alloys, molding graphite adjacent said rhenium and around said refractory material-rhenium composite and then heat treating the graphite-rhenium-refractory material prior to 15 hours after the deposition of the rhenium metal at a temperature and for a time sufficient to densify the rhenium and to improve the bond between the rhenium and the graphite and between the rhenium and the refractory material.

2. A method of coating a carbon article with a refractory metal comprising the steps of: depositing a thin transition coating of rhenium metal on a surface of the carbon article; heating the rhenium coated carbon article prior to 15 hours after the deposition of the rhenium, at a temperature and for a time sufficient to densify the rhenium and to improve the carbon-rhenium bond; and then depositing on the rhenium a refractory metal selected from the group consisting of tungsten, columbium, tantalum and their alloys.

3. A method as described in claim 2 in which the temperature at which the rhenium coated carbon article is heated is 1650°–2000° C.

4. In a method of coating a carbon article with a refractory metal, the steps of: depositing a coating-thin transition layer of rhenium metal on a carbon surface of the article; and then heating the rhenium coated carbon article prior to 15 hours after the deposition of the rhenium, at a temperature and for a time sufficient to bond the rhenium to the carbon.

5. In a method of coating a carbon article with a refractory metal, the steps of: electroplating a thin transition coating of rhenium metal on a surface of the carbon article; heating the coated article at 1650°–2000° C. prior to 15 hours after electroplating the rhenium; and then metal spray depositing over the rhenium metal a layer of a refractory metal selected from the group consisting of tungsten, columbium, tantalum and their alloys.

6. In a method of coating a carbon article with a refractor metal, the steps of: electroplating about a one mil coating of rhenium metal on a surface of the carbon article from an aqueous potassium perrhenate solution of 7.5–15 grams per liter at a pH of 0.5–1.5 and a current density of 0.1–0.7 ampere per square centimeter; heating the rhenium plated article at 1650°–2000° C. prior to 15 hours after electroplating the rhenium; and then metal spray depositing up to about 50 mils of tungsten over the rhenium.

7. A carbon article having a refractory metal surface resistant to highly ablating conditions comprising: a thin transition portion of rhenium metal bonded with the carbon article; and an outer portion of a refractory metal selected from the group consisting of tungsten, columbium, tantalum and their alloys bonded with the rhenium metal.

8. A carbon article having a refractory metal surface resistant to highly ablating conditions comprising: a transition coating of rhenium metal of about one mil thick bonded with the carbon article, and up to about 50 mils of tungsten bonded with the rhenium metal.

References Cited in the file of this patent

UNITED STATES PATENTS

| | | |
|---|---|---|
| 1,565,724 | Fonda | Dec. 15, 1925 |
| 2,282,097 | Taylor | May 5, 1942 |
| 2,310,002 | Van Geel | Feb. 2, 1943 |
| 2,497,110 | Williams | Feb. 14, 1950 |
| 2,778,786 | Pearlman | Jan. 22, 1957 |